Oct. 11, 1955
F. E. STIRN ET AL
2,720,109
POWDER DENSITY DETERMINATION
Filed Jan. 13, 1951
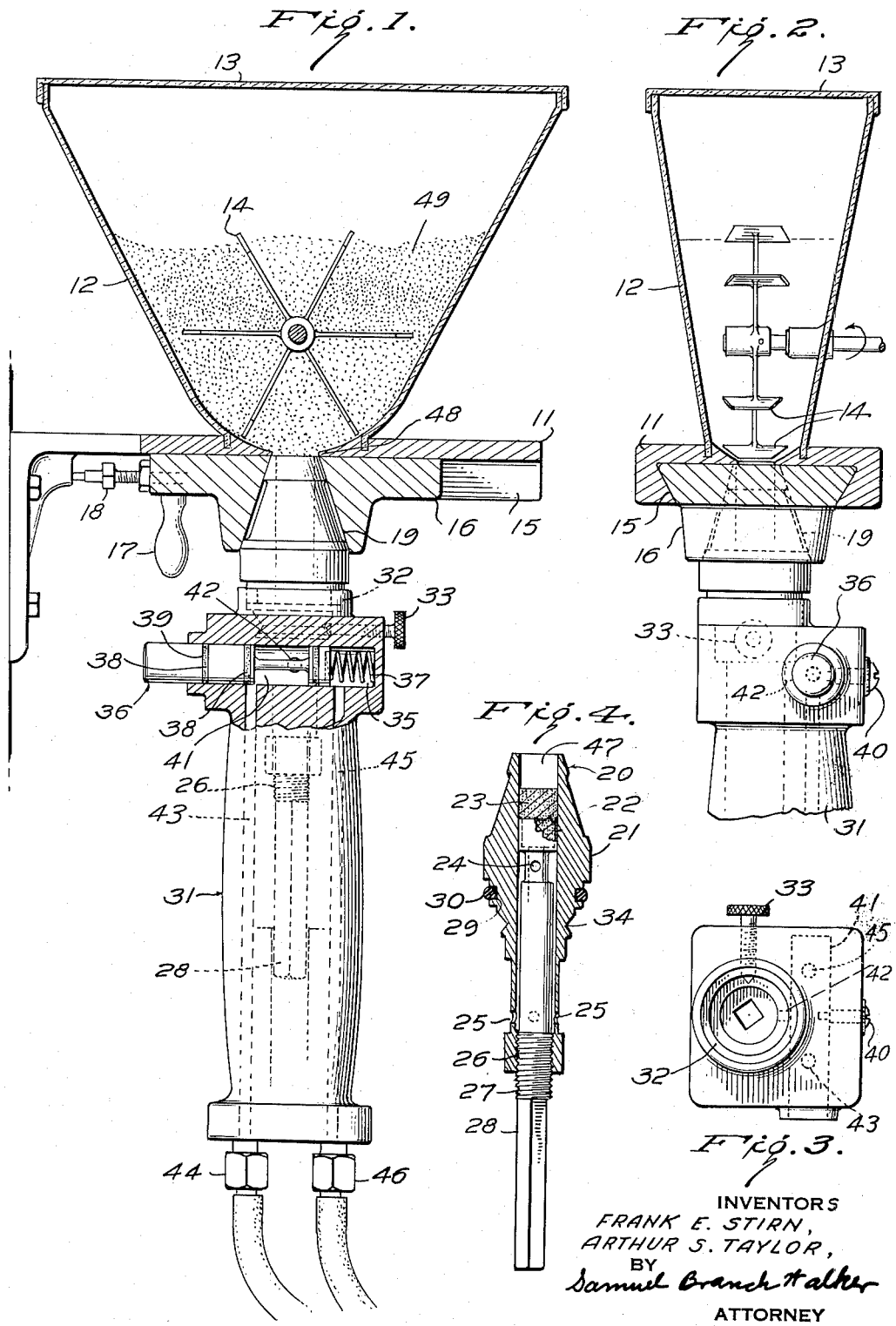
INVENTORS
FRANK E. STIRN,
ARTHUR S. TAYLOR,
BY
Samuel Branch Walker
ATTORNEY

United States Patent Office 2,720,109
Patented Oct. 11, 1955

2,720,109

POWDER DENSITY DETERMINATION

Frank Edwin Stirn, Pearl River, and Arthur Sinclair Taylor, Spring Valley, N. Y., assignors to American Cyanamid Company, New York, N. Y., a corporation of Maine Application January 13, 1951, Serial No. 205,908

2 Claims. (Cl. 73—32)

The present invention relates to a machine for measuring and adjusting the density of powders and to a method of using the machine for the measurement of the density of powders and a method for adjusting the density of powders, and a method for adjusting the active strength in powders.

As described in our co-pending application, Serial No. 765,680, filed August 2, 1947, now Patent No. 2,540,059, January 30, 1951, of which this is a continuation-in-part, we found that powders compact to a substantially constant density when filled into a chamber by means of a gas such as air which carries the powders into the chamber by the effect of reduced pressure.

We have now found that the density of powders may be more accurately and uniformly determined by using a standard size chamber and standard pressure conditions than by previously known methods. We have furthermore found that by measuring the density of the powders, that is by measuring the weight of a given volume, it is convenient to calculate the concentration of a particular active ingredient in a blend of powders and by adding a diluent or by additional grinding or other means adjust the apparent powder density of an active ingredient to a uniform value. This renders it commercially possible to fill pharmaceutical powders by volume measurement with the knowledge that the dosage charges are closer to a desired value than previously possible.

A standard method of determining the density of powders has been described in the British Standard 1460; 1948 for precipitated calcium carbonate. Other methods are known. Among such tests are compaction tests based on weighing powder into a glass cylinder and tapping the cylinder laterally or vertically under standard conditions to determine the volume. Other methods have been based on compression. A series of operators using magnesium stearate in a tapping method had a co-efficient of variation of 2.15%. On the same powder the same operators had a result of 0.97% using the herein described method. Furthermore in the compaction of powders, the skill of the operator in using uniform conditions is critical. Using our powder chamber, it is possible to use a uniform temperature, a uniform size of chamber and obtain uniform results independent of the operator and his skill. It thus renders it possible to obtain a value for the density of powders to a higher degree of accuracy than that previously known, and which is consistent among several operators.

We find it particularly convenient to compute the apparent density of powders by this method because there is obtained a result which is significant under all conditions.

In measuring many types of materials, particularly in the pharmaceutical profession, it is more convenient to use a volume than a weight measure. For years, it has been customary to adjust the strength of liquids through dilution so that a given volume would contain a given weight of a desired material. Prior to our invention it has not been possible to use such a procedure with powders because the measurement of density was too uncertain. We have now found that by measuring the density by our machine it is possible to calculate the amount of an active ingredient per unit of volume and by either grinding the powders finer so as to reduce their apparent density or by adding an inert diluent so as to reduce the concentration of active material, it is possible to obtain a powder which when measured under our standard conditions has a definite concentration of active material per unit of volume. Such material is particularly useful in filling of hard-shell capsules in which each capsule has a standard volume and is filled with a powder. It is also particularly useful in filling soft-shell capsules using a metering roll having cavities of uniform size. It also provides means whereby other types of containers, such as bottles, can be filled by volume measure rather than by weight with the assurance that the amount of active ingredient is as desired.

By way of illustration there is shown a particular embodiment of a machine for the measurement of powder density and a description of its use.

In the drawings:

Figure 1 shows a partial sectional view of our apparatus.

Figure 2 shows a partial section laterally through the slide and hopper.

Figure 3 shows an end view of the operating handle.

Figure 4 shows a sectional view of the powder chamber assembly.

In Figure 1 there is shown a support frame 11. Integral therewith is a hopper 12. It is preferred that the hopper be transparent so that its contents may be more readily observed. A loose fitting cover 13 may be provided to exclude dust. In the hopper is an agitator 14 which may rotate or reciprocate or keep the powder dispersed and aerated. The support frame is provided with guides 15 which may be a dovetailed groove, in which is located a slide 16. The slide has a slide handle 17 and a slide stop 18 to uniformly position the slide under the hopper. In the slide is a positioning cone 19 in which fits a corresponding nose 20 of a chamber barrel 21. The nose and positioning cone should have such size that the chamber barrel fits into and is positioned in the cone with its end flush with the upper surface of the slide. The chamber barrel 21 has therein an adjustable member 22 having a foraminous material 23 fastened to the upper end thereof. The foraminous material may be felt which is held into the adjustable member by a rolled edge on the adjustable member. The foraminous material may be felt, sintered metal, screen, etc. If of metal, it may be soldered or brazed in position. Underneath the foraminous material is an axial and cross gas passage 24 whereby gases drawn through the foraminous material may pass outside of the adjustable member and down through the chamber barrel to ports 25. The lower end of the chamber barrel is threaded as shown by the barrel threads 26. The adjustable member has corresponding engaging threads 27 whereby the adjustable member may be positioned longitudinally along the chamber barrel by the operation of the threaded portions. Below the engaging threads is a square 28 whereby the adjustable member may be held against rotation. The chamber barrel may have therein a gasket slot 29 and a gasket 30 to prevent air leakage when the chamber barrel assembly is placed in an operating handle 31.

The operating handle as shown has an operating handle recess 32 adapted to receive the chamber barrel assembly including a square portion to engage the square on the adjustable member. The chamber barrel may be retained in the operating handle by a retaining screw 33. It is preferred that a retaining groove 34 be cut in the chamber barrel so that the retaining screw will not only hold the chamber barrel against rotation but will also urge it downwardly to prevent its slipping. Also the camming action of the sloped surfaces gives a more positive retention. Adjacent the operating handle recesses is an operating valve chamber 35. Any type of valve may be used but for purposes of convenience we have shown a valve plunger 36 and a valve spring 37. The valve plunger has thereon three valve gaskets 38 in valve gasket slots 39. The valve plunger is held in position by a valve retaining screw 40 which enters into the D chamber 41, so named from its general shape, in the valve plunger. From the valve chamber a valve chamber passage 42 extends into the operating handle recess. From adjacent the valve chamber there is a vacuum lead 43 which extends through the handle to a vacuum connection 44. On the opposing side of the operating handle is a gas pressure passage 45 connecting a pressure connection 46 with the valve chamber.

In normal operation, the valve plunger is spring biased so that the vacuum connection permits the vacuum to act through the vacuum lead, the D chamber, the valve chamber passage, the operating handle recess, the ports, through the chamber barrel, and the gas passage 24 on the underside of the foraminous material 23. The nose of the chamber barrel may be placed in the slide, the slide moved under the hopper into the position shown in Figure 1, and the powder contents of the hopper are thereby pulled into the upper portion of the chamber barrel 21 down against the foraminous material 23, the two portions forming the measuring chamber 47. The entire slide may then be moved to the right causing the rim 48 of the support frame to act as a doctor cutting off the powder charge to a definite volume.

In operation, a powder 49 may be placed in the hopper, a vacuum applied, the measuring chamber being thereby filled, the slide moved to the right thereby cutting off the contents in the measuring chamber, the measuring chamber removed from the slide, and its contents ejected by gas pressure operating through the pressure connection 46 and the associated passages when the valve plunger is depressed.

We prefer to leave the vacuum connected except when ejection is desired.

In operation, we prefer to use an operating temperature of about 25° C., a vacuum of 50 mm. of mercury absolute and a chamber having a diameter of approximately ⅜″ and a depth of approximately ½″. The felt, when adjusted to a desired depth, is locked by the retaining screw 33 which adjustment is not normally changed during the operation of the instrument. The ejected slug may be weighed and from the known volume its apparent density calculated.

The apparent densities as determined by using our device are not necessarily a function of those determined by previous methods. However, they are uniform and consistent among themselves.

Our device and methods have utility in determining powder densities wherever required and have utility in permitting the adjustment of a concentration of a desired ingredient under many instances. By way of illustration a typical example is given.

*Example 1*

Difficulty had been experienced in filling uniform quantities of aureomycin hydrochloride into hard shell capsules. Different batches as received had slightly different apparent densities and accordingly when the capsule shells were filled in a capsule filling plate, different quantities of the therapeutic agent were obtained. One hundred capsules were emptied, the contents weighed and analyzed for therapeutic value. Also, the apparent density was measured on our device by filling the chamber and weighing its contents. It was determined that the hundred shells had 23% excess aureomycin hydrochloride over the desired contents. The production size batch of aureomycin hydrochloride had added thereto finely ground cottonseed meal until when tested with our device, the weight of the slug ejected bore such relationship to the total weight of the diluted batch of powder as to indicate that a 23% reduction in therapeutic contents had been obtained. The calculations and procedures are identical with those used in diluting solutions to a desired concentration, except that the volumes obtained were not the sum of the two volumes mixed. The thus diluted powder was again run through the filling plates into the capsules and on measurement the capsules were found to be properly filled. A record was kept of the concentration of therapeutic material and subsequent batches were diluted so that the concentration of therapeutic material was the same as in the first batch. Said subsequent batches were found to be extremely close to the desired values. Because of the increased accuracy, it was found that the "overage," that is, the amount which is normally added in excess of the label claims, could be reduced. One of the heavy costs in pharmaceutical manufacture is the "overage" which is necessary so that the manufacturer can be sure that each capsule has as a minimum the labelled quantity of therapeutic material. Because our procedure permits a more accurate control of the filled quantities, this "overage" can be reduced with the assurance that each capsule has as a minimum the labelled quantity of therapeutic product, and the cost of such capsules thereby is reduced.

Having thus described certain modifications thereof, as our invention we claim:

1. An apparatus for determining the apparent density of a powder which comprises a support frame, a powder hopper above said support frame, an agitating means in said powder hopper, guide means attached to the support frame having an aperture therethrough communicating with the interior of said hopper, relatively movable slide means guided by said guide means, said slide having a positioning cone therein, a chamber barrel, a nose functionally integral with said chamber barrel, said nose being of such configuration as to match the positioning cone and be positioned thereby with the surface of said nose continuous with a surface of said slide means, a foraminous material in said chamber barrel, a valve means, passage means from the lower side of said foraminous material to said valve means, a vacuum lead and a pressure lead, said valve means being operable to connect either said vacuum lead or said pressure lead to the foraminous material, whereby a powder charge may be drawn into the chamber barrel and released therefrom.

2. An apparatus for determining the apparent density of a powder which comprises powder supporting means having an aperture therethrough for a homogeneous powder, guide means in juxtaposition to said powder supporting means, a relatively movable slide guided by said guide means having a positioning opening therein, a chamber barrel, a nose functionally integral with said chamber barrel said nose being of such configuration as to match the positioning opening and be positioned thereby with the surface of said nose continuous with a surface of said slide, a foraminous material in said chamber barrel, a valve means, passage means from the lower side of said foraminous material to said valve means, a vacuum lead and a pressure lead, said valve means being operable to connect either said vacuum lead or said pressure lead to the foraminous material, whereby a powder charge may be drawn into the chamber barrel and released therefrom.

References Cited in the file of this patent

UNITED STATES PATENTS

| | | |
|---|---|---|
| 1,052,653 | Crowley | Feb. 11, 1913 |
| 1,879,794 | Cundall | Sept. 27, 1932 |
| 2,423,173 | Brady et al. | July 1, 1947 |